United States Patent
Gao

(10) Patent No.: US 8,830,487 B2
(45) Date of Patent: Sep. 9, 2014

(54) SYSTEM AND METHOD FOR SEPARATING IMAGE AND TEXT IN A DOCUMENT

(75) Inventor: Ying Gao, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 164 days.

(21) Appl. No.: 13/543,973

(22) Filed: Jul. 9, 2012

(65) Prior Publication Data

US 2014/0009772 A1 Jan. 9, 2014

(51) Int. Cl.
*G06K 15/02* (2006.01)
*G06F 3/12* (2006.01)
*G06K 15/00* (2006.01)

(52) U.S. Cl.
USPC .............. 358/1.11; 358/1.1; 358/1.9; 358/2.1

(58) Field of Classification Search
USPC ............... 358/1.1, 1.9, 1.11, 1.12, 1.13, 1.14, 358/1.15, 1.16, 1.17, 1.18
See application file for complete search history.

(56) References Cited

U.S. PATENT DOCUMENTS

| | | | |
|---|---|---|---|
| 7,257,771 B2 * | 8/2007 | Buser et al. .................. | 715/239 |
| 7,292,710 B2 | 11/2007 | Fan et al. | |
| 7,392,473 B2 | 6/2008 | Meunier | |
| 7,693,848 B2 | 4/2010 | Dejean et al. | |
| 7,743,327 B2 | 6/2010 | Meunier et al. | |
| 7,890,859 B2 | 2/2011 | Meunier | |
| 7,937,653 B2 | 5/2011 | Dejean et al. | |
| 2006/0248070 A1 | 11/2006 | Dejean et al. | |
| 2011/0149098 A1* | 6/2011 | Ahn et al. .................. | 348/222.1 |
| 2013/0314561 A1* | 11/2013 | Balannik et al. ........... | 348/222.1 |

OTHER PUBLICATIONS

U.S. Appl. No. 13/494,173, filed Jun. 12, 2012; Bala et al; Finding Text in Natural Scenes.

* cited by examiner

*Primary Examiner* — Thierry L Pham

(57) ABSTRACT

The disclosed embodiment relates to system and method for separating background image from foreground text in one or more electronic pages. The one or more electronic pages are compared to check whether the background image in each of the one or more electronic pages are same. If it found that the one or more electronic pages have common background image, the common background image is subtracted from each of the one or more pages. The foreground text from each of the one or more electronic pages is recognized using an OCR. Finally, the recognized foreground text from each of the one or more electronic pages is consolidated in a file. The consolidated file can be printed or send to one or more recipients over an email.

14 Claims, 4 Drawing Sheets

SYSTEM AND METHOD FOR SEPARATING IMAGE AND TEXT IN A DOCUMENT

COPYRIGHT NOTICE

A portion of the disclosure of this patent document contains material that is subject to copyright protection. The copyright owner has no objection to facsimile reproduction by anyone of the patent document or the patent disclosure as it appears in the Patent and Trademark Office patent file or records but otherwise reserves all copyright rights whatsoever.

FIELD

The presently disclosed embodiments are related to a computing device. More specifically, the presently disclosed embodiments are related to a computing device that separates an image portion and a text portion in a document.

BACKGROUND

A typical Multifunction device (MFD) includes a scanner and a printer for scanning and printing one or more documents respectively. In certain scenarios, the MFD scans one or more documents that include a background image and a foreground component. The background image may correspond, but not limited to, a watermark, power point template, or any similar image. The foreground component may include a foreground text and a foreground image.

Printing such documents may require a large amount of toner ink in comparison to printing documents that just include the text. Further, storing such documents may require a large amount of disk space in comparison to storing documents that just include the text.

SUMMARY

According to embodiments illustrated herein, there is provided a method for processing one or more electronic pages. Each of the one or more electronic pages includes a foreground component and a background image. The method comprising comparing a first electronic page with a second electronic page for determining an identical background image in the first electronic page and the second electronic page. The method further includes extracting the foreground component from the second electronic page and the first electronic page based on the identical background image. Finally, the method includes creating a file based on the extraction.

According to embodiments illustrated herein, there is provided a method for processing an electronic page including a foreground component and a background image. The method comprising extracting the foreground component from the electronic page based on one or more image-processing techniques. The one or more image-processing techniques include at least an edge detection technique. The method further includes creating a file based on the extracted foreground component.

A multifunction device for processing one or more electronic pages. Each of the one or more electronic pages includes a foreground component and a background image. The multifunction device comprising a comparison module configured to compare a first electronic page and a second electronic page of the one or more electronic pages to determine an identical background image in the first electronic page and the second electronic page. The multifunction device further comprising an extraction module configured to extract the foreground component from the first electronic page and the second electronic page based on the identical background image. A processing module configured to creating a file based on the extracted foreground component.

BRIEF DESCRIPTION OF DRAWINGS

The accompanying drawings illustrate various embodiments of systems, methods, and embodiments of various other aspects of the disclosure. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

Figure 1:
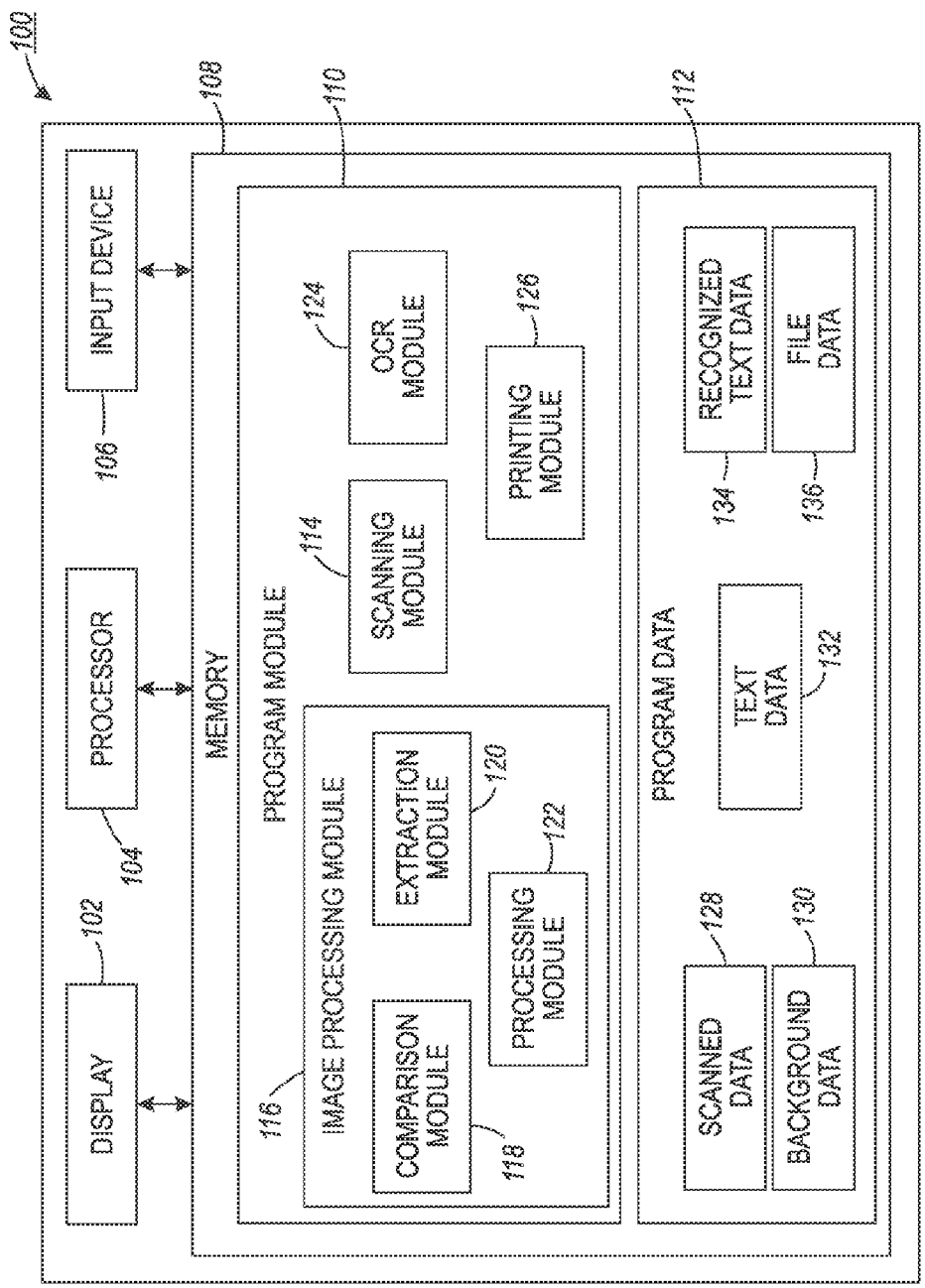
FIG. 1 is a block diagram of a Multi Functional Device (MFD) in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITION

The following terms shall have, for the purposes of this application, the respective meanings set forth below.

A Multi Function Device (MFD) refers to a device that can perform multiple functions. Examples of the functions include, but are not limited to, printing, scanning, copying, faxing, emailing, and the like. In an embodiment, the MFD includes a scanner and a printer for scanning and printing one or more documents respectively. In an embodiment, the MFD has communication capabilities that enable the MFD to send/receive data and messages in accordance with one or more communication protocols such as, but not limited to, FTP, WebDAV, E-Mail, SMB, NFS, and TWAIN.

A Print refers to an image on a medium (such as paper), that is capable of being read directly through human eyes, perhaps with magnification. According to this disclosure, handwritten or partially handwritten image on a medium is considered as an original print. In an embodiment, a duplicate print corresponds to an exact replica of the original print derived by scanning, printing or both.

A Printer refers to any apparatus, such as a digital copier, bookmaking machine, facsimile machine, multi-function machine (performing scanning, emailing), and the like, which performs a print (original and/or duplicate) outputting function for any purpose in response to digital data sent thereto.

An Image file refers to a collection of data, including image data in any format, retained in an electronic form.

Scanning refers to recording an image on a print as digital data in any format, thereby creating an image file.

Background image refers to an image that acts as a background for other images and/or text on a document. In an embodiment, the opacity of the background image is adjusted in a manner that the images and text overlaid on the background image are clearly visible. In an embodiment, the background image corresponds to, but not limited to, an advertisement, a company logo, a picture, a watermark, or any image having opacity such that the other images and text overlaid on the image are clearly visible.

Foreground component corresponds to a text portion and/or an image portion that is overlaid on top of a background image.

User input refers to one or more commands or instruction given by a user to a MFD to perform an operation. In an embodiment, the one or more commands may include, but not limited to, a print command, a scan command, copy command, and so forth.

Image processing refers to one or more operations performed on an image to change one or more aspects associated with an image. In an embodiment, the one or more aspects include, but not limited to, brightness, contrast, hue, noise reduction, blur reduction, and the like.

Edge detection refers to an image processing technique in which edge of an image is identified. The edge detection technique identifies a portion of the image where image brightness or contrast changes sharply. The edge detection technique highlights such portions in the image as an edge.

FIG. 1 is a block diagram of a Multi Functional Device (MFD) in accordance with at least one embodiment. The MFD 100 includes a display 102, a processor 104, an input device 106, and a memory 108.

The display 102 displays a user interface on the MFD 100. The display 102 can be realized through several known technologies, such as, Cathode Ray Tube (CRT) based display, Liquid Crystal Display (LCD), Light Emitting Diode (LED)-based display, Organic LED display technology, and Retina Display technology. Further, the display 102 can be a touch screen that receives a user input.

The processor 104 is coupled to the display 102, the input device 106, and the memory 108. The processor 104 executes a set of instructions stored in the memory 108 to perform one or more operations on the MFD 100. The processor 104 can be realized through a number of processor technologies known in the art. Example of the processor 104 can be, but is not limited to, X86 processor, RISC processor, ASIC processor, CISC processor, or any other processor. In an embodiment, the processor 104 includes a Graphics Processing Unit (GPU) that executes the set of instruction to perform one or more image-processing operations.

The input device 106 receives a user input. Examples of the input device 106 may include, but are not limited to, a keyboard, a mouse, a stylus or a touch screen. Further, the input device 106 may receive user input from a remote computing device over a network to which the MFD 100 is connected.

The memory 108 stores a set of instructions and data. Some of the commonly known memory implementations can be, but not limited to, a random access memory (RAM), read only memory (ROM), hard disk drive (HDD), and secure digital (SD) card. Further, the memory 108 includes a program module 110 and a program data 112. The program module 110 includes a set of instructions that are executable by the processor 104 to perform specific actions on the MFD 100. The program module 110 further includes a scanning module 114, an image-processing module 116, an OCR module 124, and a printing module 126. The image-processing module 116 further includes a comparison module 118, an extraction module 120, and a processing module 122. A person skilled in the art will know that the set of instructions stored in the memory 108 interact with the hardware of the MFD 100 to perform the predetermined operation.

The program data 112 includes scanned data 128, background data 130, text data 132, recognized text data 134, and file data 136.

The scanning module 114 is configured to facilitate scanning of one or more pages in conjunction with a scanner (not shown) of the MFD 100. In an embodiment, the scanning module 114 generates an image file for each of the one or more pages. Hereinafter, the image file is referred to as the one or more electronic pages. Further, the scanning module 114 stores the one or more electronic pages as the scanned data 128. In an embodiment, each of the one or more electronic pages includes a background image and a foreground component such as foreground text.

The image-processing module 116 includes a set of instruction or modules which when executed by the processor 104 varies one or more aspects associated with an image. The image-processing module 116 extracts the one or more electronic pages from the scanned data 128. Thereafter, the image-processing module 116 varies one or more aspects associated with each of the one or more electronic pages. In an embodiment, the image-processing module 116 includes a comparison module 118, an extraction module 120, and a processing module 122.

The comparison module 118 compares a first electronic page and a second electronic page of the one or more electronic pages to identify a common background image. In an embodiment, the comparison module 118 uses one or more algorithms such as, but not limited to, Scale-Invariant Feature Transform (SIFT), Grab-Cut, Genetic algorithms, Fuzzy logic, and Neural networks, to identify the common background image. The comparison module 118 stores the common background image as the background data 130.

The extraction module 120 extracts the foreground text from at least one of the one or more electronic pages based on the identified common background image. In an embodiment, the extraction module 120 extracts the foreground image by using one or more image subtraction algorithms such as, but not limited to, least square method, and cross-convolution method. In an alternative embodiment, the extraction module 120 extracts the foreground text from the one or more electronic pages using an edge detection algorithm. Some of the examples of edge detection algorithms include, but not limited to, Canny edge detection operator, Sobel operator and Prewitt operator. The extraction module 120 stores the foreground text as the text data 132.

The processing module 122 extracts recognized foreground text from recognized text data 134. In an embodiment, the processing module 122 consolidates the recognized foreground text from each of the one or more electronic pages to construct a file that includes only text from each of the one or more electronic pages. In an alternative embodiment, the processing module 122 extracts a substitute background image from the background data 130. Thereafter, the processing module 122 constructs a file in which the processing module 122 overlays the recognized foreground text onto the substitute background image. Further, the processing module 122 stores the file as the file data 136.

The OCR module 124 extracts the foreground text from the text data 132. Thereafter, the OCR module 124 recognizes one or more characters in the foreground text. The OCR module 124 stores the recognized foreground text as recognized text data 134.

The printing module 126 extracts the file from the file data 136. Further, the printing module 126 facilitates printing of the file in conjunction with a printer (not shown) of the MFD 100.

Figure 2:
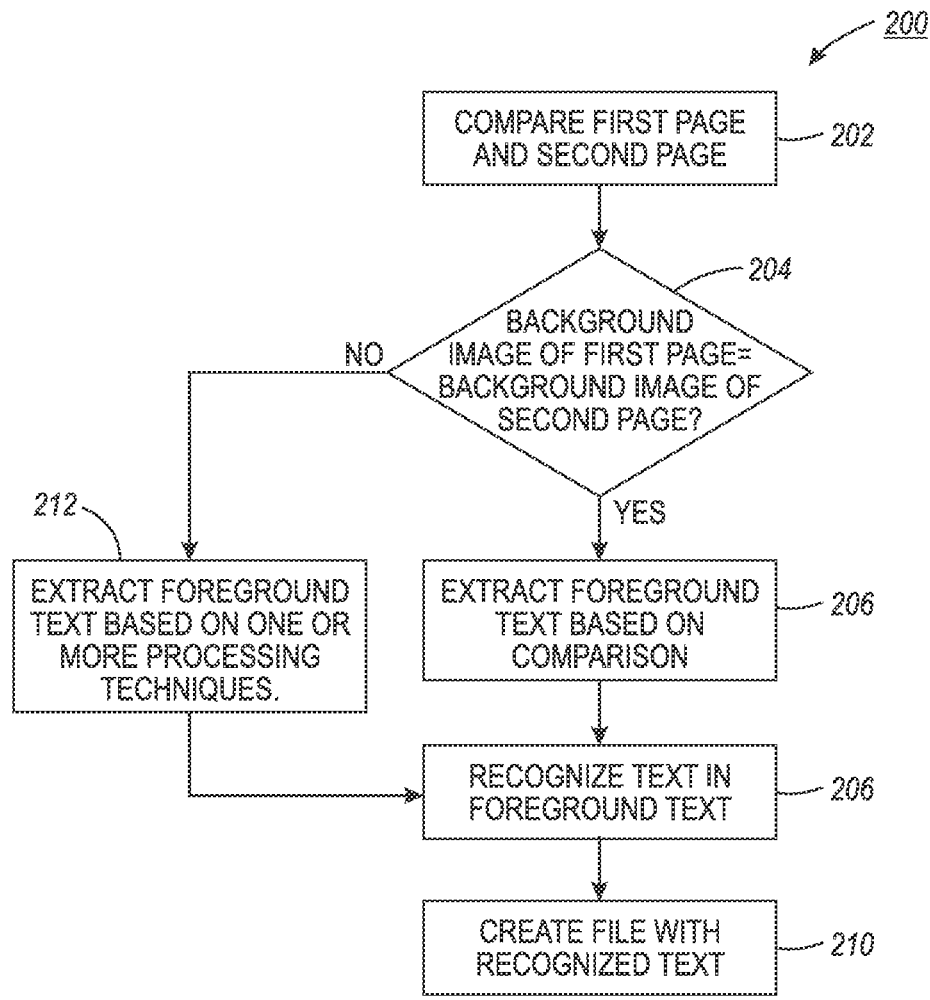
FIG. 2 is a flowchart illustrating a method for extracting foreground text from a document in accordance with at least one embodiment.

FIG. 2 is a flowchart illustrating a method for extracting foreground text from a document in accordance with at least one embodiment.

At step 202, a first electronic page and a second electronic page of one or more electronic pages are compared to determine whether a background image on the first electronic page is same as the background image on the second electronic page. In an embodiment, the comparison module 118 compares the first electronic page and the second electronic page. Prior to the comparison, the scanning module 114 scans one or more pages using a scanner in the MFD 100. Further, the scanning module 114 stores the one or more electronic pages as the scanned data 128. In an embodiment, the comparison between the first electronic page and the second electronic page to determine the common background image is carried out iteratively for each of the one or more electronic pages.

A person having ordinary skills in the art would appreciate that the scope of the disclosure should not be limited to scanning of the one or more pages to generate the one or more electronic pages. The MFD 100 may receive the one or more electronic pages from an external source. Some of the examples of the external source may include, but not limited to, digital camera, and pen pad. Further, the external source may be a remote computing device that may transmit the one or more electronic pages to the MFD 100 over an E-mail, or FAX, or any similar data transmission protocol.

At step 204, a check is performed whether the background image on the first electronic page is same as the background image on the second electronic page. For example, the comparison module 118 performs the check. In an embodiment, the comparison module 118 includes various algorithms such as SIFT to determine whether the background image on the first electronic page is same as the background image on the second electronic page. The comparison module 118 uses SIFT to determine one or more key-points of the background image on the first electronic page. Similarly, the comparison module 118 uses SIFT to determine one or more key-points of the background image on the second electronic page. Thereafter, the comparison module 118 compares the one or more key points on the first electronic page with one or more keys points on the second electronic page to determine whether the background image on the first electronic page is same as the background image on the second electronic page. If the key points on the first electronic page are same as the key points on the second electronic page, the background image on the first electronic page is same as the background image on the second electronic page. The comparison module 118 stores the common background image as the background data 130. If at step 204, the comparison module 118 determines that the background images on the first electronic page and the second electronic page are same, step 206 is performed.

A person skilled in the art would appreciate that determination of the background image has been described for illustrative purposes. The background image may be identified using various other image detection algorithms such as, but not limited to Grab-Cut, Genetic algorithms, Fuzzy logic, and Neural networks, to identify the common background image.

At step 206, the foreground text is extracted from the first electronic page and the second electronic page by subtracting the common background image. In an embodiment, the foreground text is extracted by the extraction module 120. The extraction module 120 uses one or more image subtraction techniques to subtract the common background image. Some of the examples of image subtraction techniques include, but not limited to, least square method, pixel subtraction, cross-convolution method, etc. Similarly, the extraction module 120 extracts the foreground text from each of the one or more electronic pages. In an embodiment, the extracted foreground text is an image of the actual foreground text.

At step 208, characters in the extracted foreground text are recognized. In an embodiment, the OCR module 124 recognizes the characters in the foreground text.

At step 210, a file including the recognized foreground text from each of the one or more electronic pages is created. In an embodiment, the processing module 122 creates the file.

In an alternative embodiment, the processing module 122 extracts a substitute background image from the background data 130. The background data 130 contains a collection of user provided background images. This background images can be installed from thumb drive or scanned into background form. In an embodiment, the substitute background image is different from the common background image. The processing module 122 swaps the common background image from each of the one or more electronic pages with the substitute background image. Swapping of the background image is described in conjunction with FIG. 3.

In an embodiment, post the creation of the file, the processing module 122 triggers the printing module 126 to print the file including the recognized foreground text from each of the one or more electronic pages. In an alternative embodiment, the processing module 122 may send the file to one or more recipients over an E-mail or FAX.

If at step 204, it is determined that the first page and the second page from the one or more electronic pages do not have a common background, step 212 is performed. At step 212, the foreground text is extracted from the one or more electronic pages using one or more image-processing techniques. In an embodiment, the extraction module 120 extracts the foreground text from the one or more electronic pages using one or more image-processing techniques. For example, the extraction module 120 uses edge detection technique, such as Canny edge detection, to extract the foreground text. The extraction module 120 analyzes the one or more electronic pages to identify a portion of the image where image brightness or contrast changes sharply. The extraction module 120 highlights such portions in the image. In an embodiment, the change in brightness or contrast is indicative of presence of foreground text. The detection of the foreground text using edge detection technique is described in detail in conjunction with FIG. 4.

Post the extraction of the foreground text, steps 208-210 is performed as described above.

In an embodiment, the step 212 along with step 208-210 can act as a standalone method to extract the background image from the foreground text. For example, at step 212 extraction module 120 extracts foreground text from each of the one or more electronic pages using one or more image-processing techniques (e.g. edge detection). Thereafter, at step 208 the OCR module 124 recognizes one or more characters in the extracted foreground text. Finally, at step 210, the processing module 122 creates a file that includes the recognized foreground text.

A person skilled in the art would appreciate that the scope of the disclosed embodiments should not be limited to extraction of the background image and recognition of the foreground text. In an embodiment, a foreground image along with the foreground text can also be extracted. For example, one or more electronic pages include a foreground text, a common background image and a foreground image. The comparison module 118 identifies the common background image as described in step 202. The extraction module 120 subtracts the common background image from each of the one or more electronic pages to extract the foreground text and the foreground image (i.e., foreground component). In an embodiment, the processing module 122 overlays the foreground text and the foreground image on a substitute background image. In an alternate embodiment, the OCR module 124 separates the foreground text and the foreground image by recognizing the foreground text. In another alternate embodiment, the extraction module 120 utilizes image-processing techniques (e.g., edge detection) to identify the foreground text. Thereafter, the OCR module 124 recognizes characters in the identified foreground text. The processing module 122 separates the foreground image and the recognized foreground text by moving the recognized foreground text from the one or more electronic pages (without the common background image) to a file that includes only the foreground text.

Figure 3:
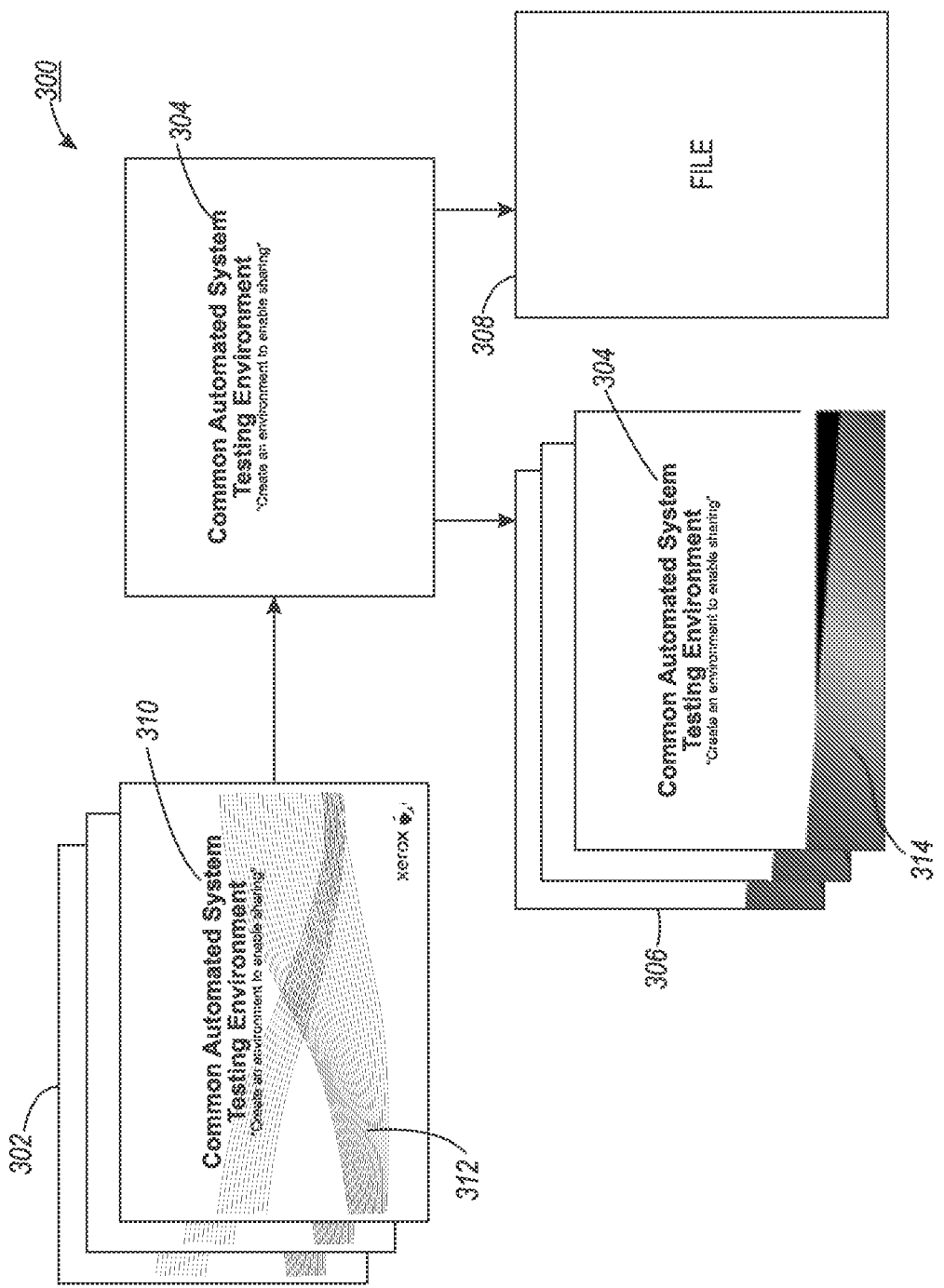
FIG. 3 is a process flow diagram for illustrating processing of one or more documents in accordance with at least one embodiment.

FIG. 3 is a process flow diagram 300 illustrating processing of one or more documents in accordance with at least one embodiment. The process flow diagram 300 includes one or more electronic pages 302. The one or more electronic pages 302 include a foreground text 310 and a background image 312. The process flow diagram 300 is described in conjunction with FIG. 1.

The comparison module 118 (refer FIG. 1) compares the one or more electronic pages 302 with each other to determine whether each of the one or more electronic pages 302 include a common background image. Since, the one or more electronic pages 302 have a common background image (i.e., the background image 312), the extraction module 120 extracts the foreground text from each of the one or more electronic pages 302 (depicted by 304) by subtracting the common background image from each of the one or more electronic pages.

In an embodiment, the processing module 122 utilizes the extracted foreground text (depicted by 304) from each of the one or more electronic pages 302 to create a second one or more pages 306 having a substitute background image 314.

In an alternative embodiment, the processing module 122 creates a file 308 that includes the foreground text (depicted by 304) from each of the one or more electronic pages 302. In certain scenarios, the background image 312 on each of the one or more electronic pages 302 occupies more space than the foreground text 310. Thus, the file 308 that includes just the foreground text 310 from each of the one or more electronic pages 302 would occupy less amount of disk space in comparison to disk space required to store the one or more electronic pages 302. Since, the file includes just the foreground text 310; the file would have fewer pages in comparison to the one or more electronic pages. Printing the file 310 would require less toner ink in comparison to toner ink required to print the one or more electronic pages 302.

Figure 4:
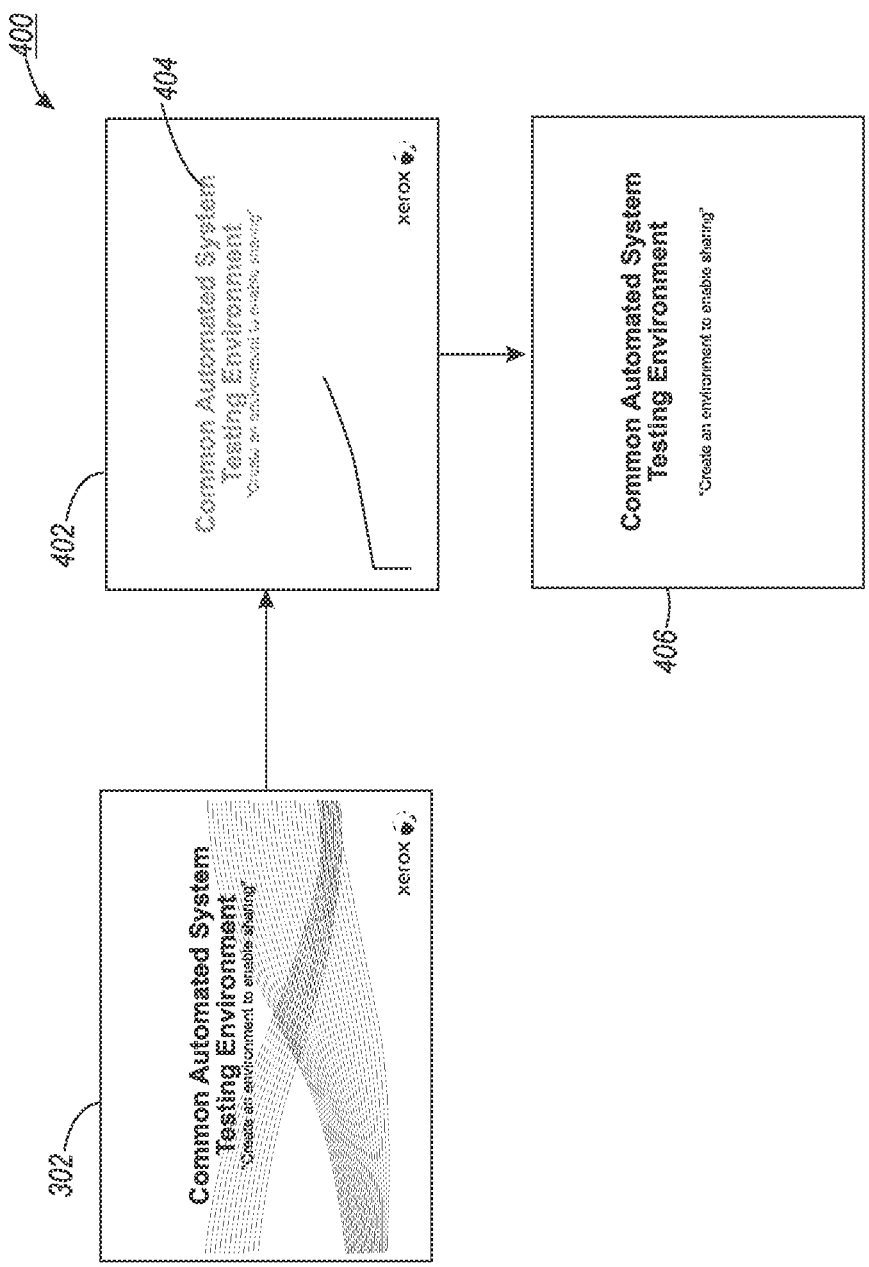
FIG. 4 is another process flow diagram illustrating processing of one or more documents in accordance with at least one embodiment.

FIG. 4 illustrates another process flow diagram 400 illustrating processing of one or more documents in accordance with at least one embodiment. The process flow diagram 400 is explained in conjunction with FIG. 1.

The process flow diagram 400 includes a scanned page 302 (refer FIG. 3). The extraction module 120 (refer FIG. 1) determines the foreground text using an edge detection technique to generate an outline (depicted by 404) of the foreground text. The extraction module 120 creates outline at a portion where image brightness or contrast changes sharply.

The OCR module 124 recognizes the characters depicted by the outline 404 to recognize the foreground text (depicted by 406).

From the disclosed embodiments, it can be observed that the background image from the one or more electronic pages are removed by using one or more image processing algorithms. Performing an OCR operation on foreground text, after the removal of the background image, is more efficient in comparison to performing OCR operation on the foreground text without removing the background image.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', 'Windows', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the system and method for separating image and text in a document have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for processing one or more electronic pages, wherein each of the one or more electronic pages includes a foreground text and a background image, the method comprising:
   in a multifunction device:
   comparing a first electronic page with a second electronic page for determining an identical background image in the first electronic page and the second electronic page;
   extracting the foreground text from each of the second electronic page and the first electronic page based on the identical background image;
   creating a file comprising the foreground text extracted from each of the first electronic page and the second electronic page; and
   printing the file such that an amount of marking material used for printing the file is less in comparison to printing both the first electronic page and the second electronic page.

2. The method of claim 1 further comprising obtaining the one or more electronic pages from an external source, wherein the external source corresponds to at least one of a scanner, a printer, or a computing device.

3. The method of claim 1 further comprising recognizing the extracted foreground text by performing Optical Character Recognition (OCR).

4. The method of claim 1, wherein the file includes the extracted foreground text and a substitute background image, wherein the extracted foreground text is superimposed on the substitute background image.

5. The method of claim 1 further comprising storing the created file and the extracted background image in a server.

6. The method of claim 1 further comprising performing one or more operations on the file, wherein the one or more operations comprise at least faxing the file, or E-mailing file.

7. The method of claim 1, wherein the foreground text is extracted based on one or more image-processing techniques, wherein the one or more image-processing techniques include at least one of an edge detection technique, an image subtraction, or an image addition.

8. A multifunction device for processing one or more electronic pages, wherein each of the one or more electronic pages comprise a foreground text and a background image, the multifunction device comprising:
   a comparison module configured to compare a first electronic page and a second electronic page from the one or more electronic pages to determine an identical background image in the first electronic page and the second electronic page;
   an extraction module configured to extract the foreground text from the first electronic page and the second electronic page based on the identical background image;
   a processing module configured to create a file comprising the foreground text extracted from each of the first electronic page and the second electronic page; and
   a printing module configured to print the file such that an amount of marking material used for printing the file is less in comparison to printing both the first electronic page and the second electronic page.

9. The multifunction device of claim 8, wherein each of the one or more electronic pages comprises a foreground image.

10. The multifunction device of claim 8, wherein the one or more electronic pages are received from an external source, wherein the external source corresponds to at least one of a scanner, a printer, or a computing device.

11. The multifunction device of claim 8 further comprising an OCR module configured to recognize the foreground text.

12. The multifunction device of claim 8, wherein the file includes the extracted foreground text and a substitute background image, wherein the processing module superimposes the extracted foreground text on the substitute background image.

13. A computer program product for use with a computer, the computer program product comprising a non-transitory computer readable medium, wherein the non-transitory computer readable medium stores a set of instructions, the set of instructions being executable by a processor to:
- compare a first electronic page and a second electronic page of the one or more electronic pages to determine an identical background image in the first electronic page and the second electronic page;
- extract a foreground text from the first electronic page and the second electronic page based on the identical background image;
- comprising the foreground text extracted from each of first electronic page and the second electronic page; and
- print the file such that an amount of marking material used for printing the file is less in comparison to printing both the first electronic page and the second electronic page.

14. The method of claim 1, wherein the marking material corresponds to at least a toner ink.

* * * * *